United States Patent
Kwon et al.

(10) Patent No.: US 10,792,977 B2
(45) Date of Patent: Oct. 6, 2020

(54) APPARATUS AND METHOD FOR MEASURING INTERIOR TEMPERATURE OF VEHICLE

(71) Applicants: Hyundai Motor Company, Seoul (KR); KIA Motors Corporation, Seoul (KR)

(72) Inventors: Dong Ho Kwon, Yongin-si (KR); Gee Young Shin, Suwon-si (KR); Dae Ig Jung, Suwon-si (KR); Seung Hyeok Chang, Suwon-si (KR); Young Oh Kim, Seongnam-si (KR); Hyun Hoo Jang, Asan-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 71 days.

(21) Appl. No.: 16/192,192

(22) Filed: Nov. 15, 2018

(65) Prior Publication Data
US 2020/0094650 A1    Mar. 26, 2020

(30) Foreign Application Priority Data
Sep. 21, 2018  (KR) .................. 10-2018-0114141

(51) Int. Cl.
*B60H 1/00*  (2006.01)
*G01K 1/20*  (2006.01)

(52) U.S. Cl.
CPC ........... *B60H 1/00735* (2013.01); *G01K 1/20* (2013.01); *G01K 2201/02* (2013.01)

(58) Field of Classification Search
CPC .. B60H 1/00807; G01K 1/20; G01K 2201/02; G05D 23/27
See application file for complete search history.

(56) References Cited

U.S. PATENT DOCUMENTS

| 4,671,458 A | * | 6/1987 | Fukuda | ............... F24F 11/0009 165/237 |
| 7,841,768 B2 | | 11/2010 | Regensburger et al. | |
| 2018/0173254 A1 | * | 6/2018 | Li | ............................ G01K 1/20 |

OTHER PUBLICATIONS

DE 41 35 086 (English Translation) (Year: 1993).*

* cited by examiner

*Primary Examiner* — Jonathan Bradford
(74) *Attorney, Agent, or Firm* — Brinks Gilson & Lione

(57) ABSTRACT

An apparatus and a method for measuring interior temperature of a vehicle, the apparatus includes a base substrate provided inside an interior panel of the vehicle and a housing including an infrared ray blocking material for inhibiting temperature of an inner space from being increased. The housing includes an exposed part provided in one side of the housing and exposed to an interior space of the vehicle, and an opening on a side portion of the exposed part for allowing the inner space of the housing to communicate with the interior space through the opening. The apparatus further includes a non-contact sensor provided on the inner space of the housing for measuring temperatures of the exposed part and the opening, and a controller calculating temperature of the interior space of the vehicle with the measured values by the non-contact sensor.

13 Claims, 3 Drawing Sheets

APPARATUS AND METHOD FOR MEASURING INTERIOR TEMPERATURE OF VEHICLE

CROSS REFERENCE TO RELATED APPLICATION

This application claims priority to and the benefit of Korean Patent Application No. 10-2018-0114141, filed on Sep. 21, 2018, which is incorporated herein by reference in its entirety.

FIELD

The present disclosure relates to an apparatus and a method for measuring interior temperature of a vehicle.

BACKGROUND

The statements in this section merely provide background information related to the present disclosure and may not constitute prior art.

Generally, it is desired to measure interior temperature of a vehicle accurately for automatically controlling an air conditioner of the vehicle. For that purpose, there is a method of sucking indoor air and then measuring temperature of the indoor air, but such a method needs a separate motor.

In addition, there has been a way of measuring temperature of air by using a non-contact method by a device installed on an interior panel of a vehicle, but this method is affected by external direct sunlight, heating of a control board of PCB, or heating of an engine. Thus, we have discovered that reliability of the non-contact method is decreased.

The above information disclosed in this Background section is only for enhancement of understanding of the background of the present disclosure, and therefore it may contain information that does not form the prior art that is already known to a person of ordinary skill in the art.

SUMMARY

The present disclosure provides an apparatus and a method for measuring interior temperature of a vehicle. The apparatus and method are capable of measuring the interior temperature of the vehicle by using a non-suction method and a non-contact method, and measuring the interior temperature of the vehicle accurately in consideration of disturbance by external direct sunlight or an internal heat source.

According to one aspect of the present disclosure, there is provided an apparatus and a method for measuring the interior temperature of an interior of the vehicle. The apparatus includes a base substrate provided inside an interior panel of the vehicle, and a housing installed on the base substrate to provide an inner space. The housing includes an infrared ray blocking material configured to inhibit an inner temperature inside the inner space from rising due to exposure to external infrared rays, an exposed part provided in one side of the housing and exposed to the interior space of the vehicle for being in contact with air inside the interior space, and an opening provided on a side of the exposed part. In addition, the opening is structured to communicate the inner space of the housing with the interior space of the vehicle through the opening. The apparatus further includes a non-contact sensor provided on the inner space of the housing for measuring a temperature of the exposed part and a temperature of the opening by using a non-contact method, and a controller calculating the interior temperature of the interior space of the vehicle by using measured values of the non-contact sensor.

According to a further aspect of the present disclosure, a rear end portion of the housing is fixed on the base substrate and a front end portion of the housing protrudes toward the interior space of the vehicle. The protruded front end portion passes through an interior panel of the vehicle and is exposed to the interior space of the vehicle as the exposed part of the housing.

The housing may be molded with a material including the infrared ray blocking material or coated with an infrared ray blocking film.

The housing may include a protrusion provided on an edge of the housing, and the protrusion extends toward the inner space of the housing. The protrusion may be a partition wall configured to block the non-contact sensor form measuring the temperature of the opening. The non-contact sensor may measure a temperature of an inner wall surface of the exposed part of the housing at an area above the protrusion as the temperature of the exposed part, and may measure temperature of the protrusion as the temperature of the opening of the housing.

The non-contact sensor may be provided in the inner space of the housing by being fixed at a position spaced apart from the base substrate. The non-contact sensor may be placed between the opening of the housing and the base substrate.

Since the opening is provided at a lower portion of the housing, when sunlight is incident on the interior space of the vehicle, the opening may be inhibited or prevented from being directly exposed to the direct sunlight by being shielded by the exposed part.

When the temperature of the exposed part is higher than the temperature of the opening, and direct sunlight is radiated into the interior space of the vehicle, the controller may correct the temperature of the exposed part by using a difference value between the temperature of the exposed part and the temperature of the opening, thereby calculating the interior temperature of the vehicle.

When the temperature of the exposed part is higher than the temperature of the opening, and direct sunlight is not radiated into the interior space of the vehicle, and the temperature of the exposed part is steeply increased above a predetermined rate, the controller may calculate the interior temperature of the vehicle by using the temperature of the opening.

When the temperature of the exposed part is lower than the temperature of the opening, and the vehicle is started for more than a predetermined time, the controller may correct the temperature of the exposed part by using the temperature of the opening, thereby calculating the interior temperature of the vehicle.

When the temperature of the exposed part is lower than the temperature of the opening, and the temperature of the exposed part drops precipitously above a predetermined rate, the controller may calculate the interior temperature of the vehicle by using the temperature of the opening.

The interior panel of the vehicle may include an air conditioner control panel of the vehicle.

According to a further aspect of the present disclosure, there is provided a method for measuring interior temperature of an interior space of the vehicle. The method includes the steps of providing an apparatus that includes a housing installed in the interior space, and the housing providing an inner space and including an infrared ray blocking material configured to inhibit an inner temperature inside the inner space from rising due to exposure to external infrared rays, an exposed part of the housing being exposed to the interior space of the vehicle, and the exposed part being in contact with air inside the interior space, and an opening provided in the exposed part, and the opening structured to communicate the inner space of the housing with the interior space of the vehicle, and a non-contact sensor provided on the inner space of the housing, measuring a temperature of the exposed part of the housing by using the non-contact sensor, measuring a temperature of the opening of the housing by using the non-contact sensor, determining whether direct sunlight is radiated into the interior space of the vehicle, and calculating the interior temperature of the vehicle by using the controller based on the measured temperature of the exposed part, the measured temperature of the opening, a difference value between the measured temperature of the exposed part and the measured temperature of the opening, and determination of whether direct sunlight is radiated into the interior space of the vehicle.

According to the apparatus and the method for measuring the interior temperature of the vehicle of the present disclosure, the interior temperature of the vehicle is measured by using a non-suction method and a non-contact method, and can be accurately measured in consideration of disturbance by external direct sunlight or an internal heat source.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
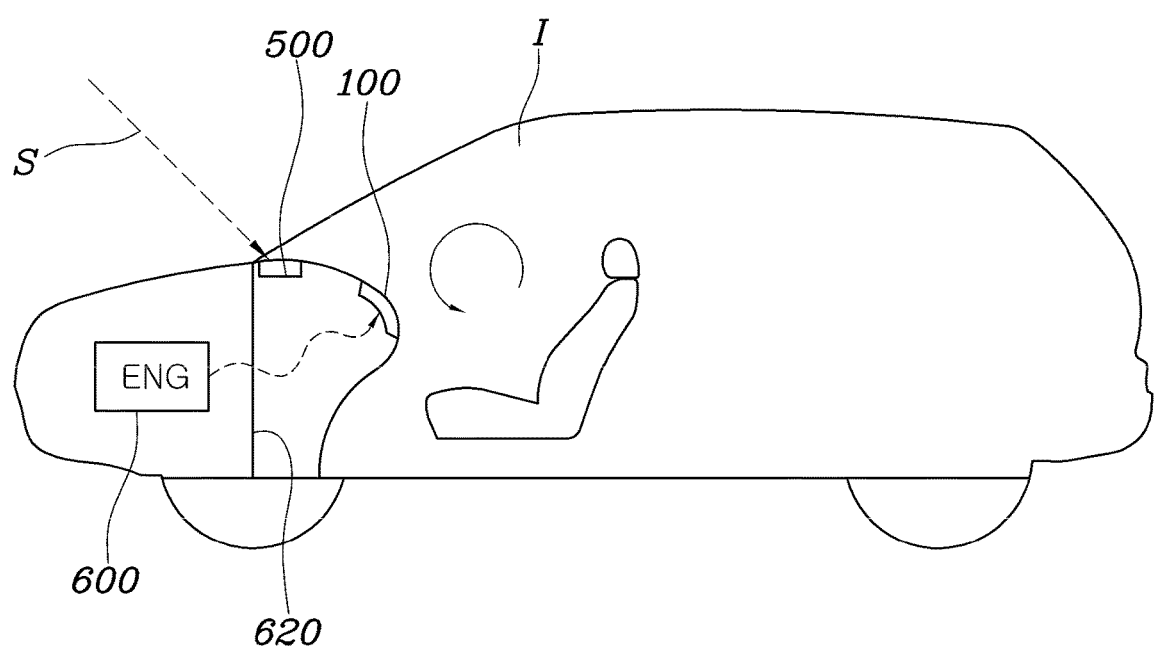
FIG. 1 is a side view of a vehicle having an apparatus for measuring interior temperature of the vehicle according to a form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 2:
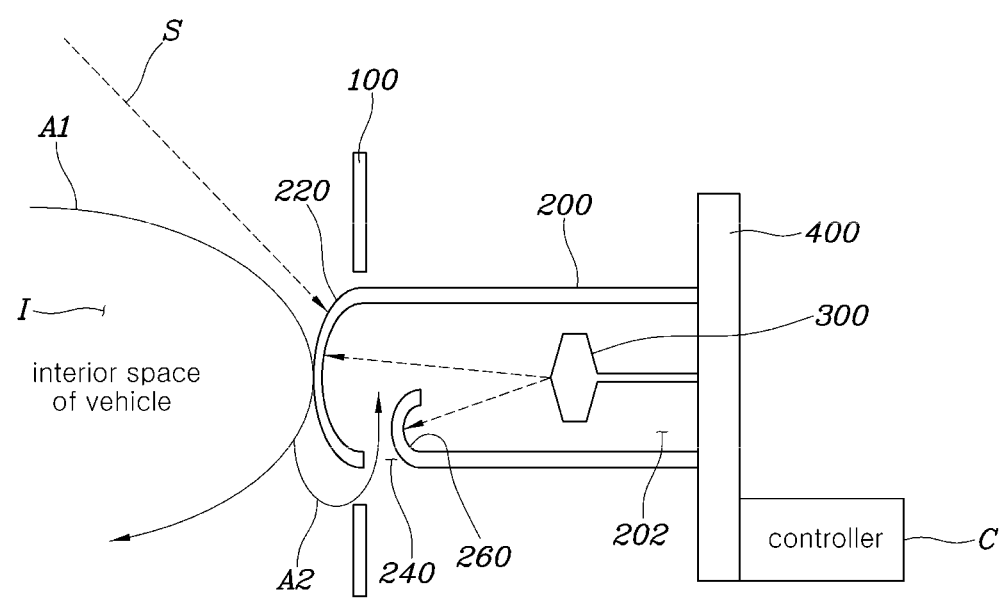
FIG. 2 shows a structure of the apparatus for measuring the interior temperature of the vehicle according to the form of the present disclosure.
Figure 3:
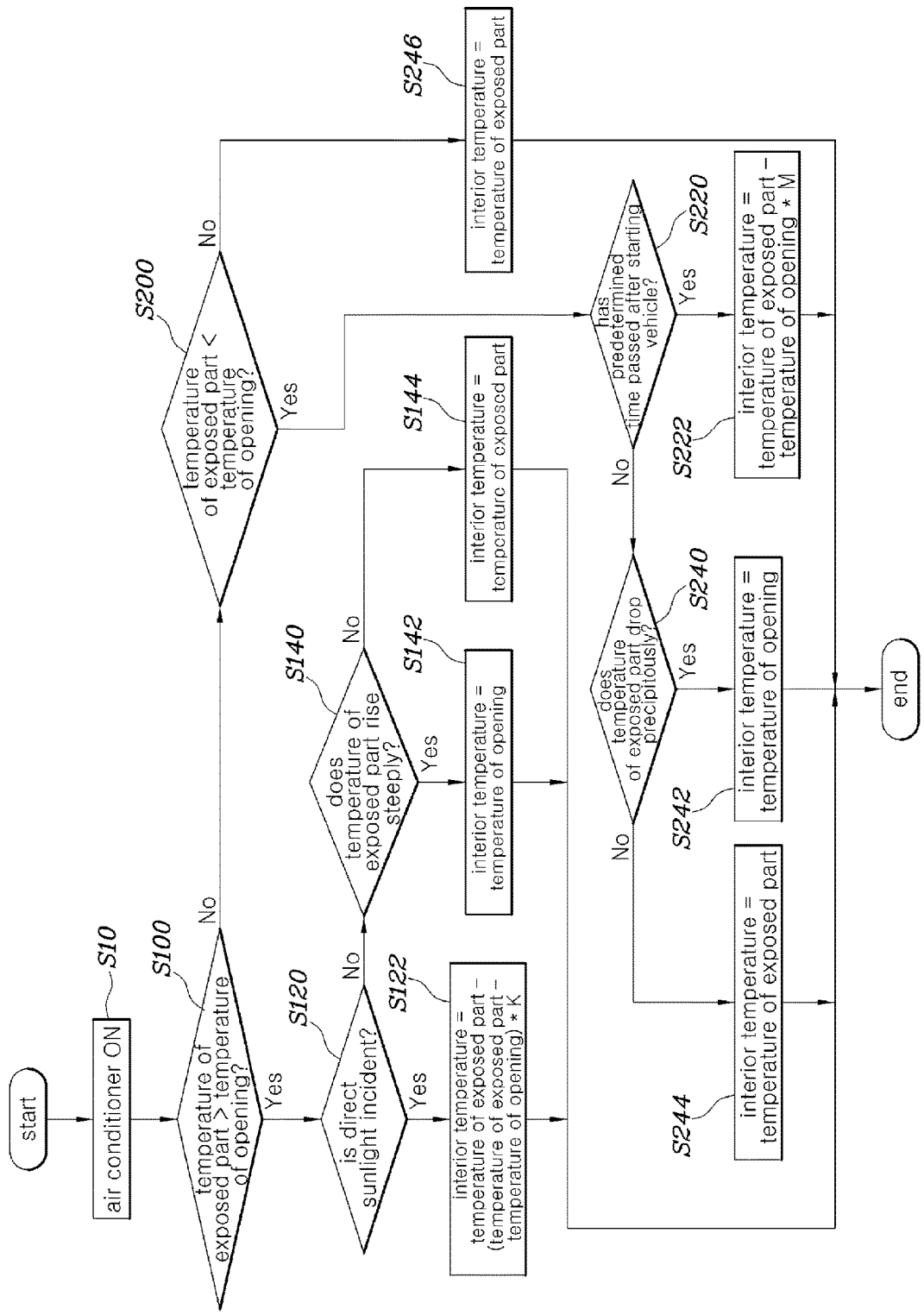
FIG. 3 is a flowchart of a method for measuring the interior temperature of the vehicle by using the apparatus in FIG. 1.

FIG. 1 shows a vehicle with an apparatus for measuring interior temperature of the vehicle according to a form of the present disclosure. FIG. 2 shows a structure of the apparatus for measuring the interior temperature of the vehicle according to the form of the present disclosure. FIG. 3 is a flowchart of a method for measuring the interior temperature of the vehicle by using the apparatus in FIGS. 1 and 2.

Referring to FIGS. 1 and 2, the apparatus for measuring the interior temperature of the vehicle according to the present disclosure includes a base substrate 400 provided inside an interior panel 100 of the vehicle, a housing 200 installed on the base substrate 400 for providing an inner space 202 of the housing. The housing 200 includes an infrared ray blocking material for inhibiting an inner temperature inside the inner space 202 from rising due to exposure to external infrared rays with an exposed part 220 provided in one side of the housing and exposed to an interior space I of the vehicle. Thus, the exposed part 220 of the housing 200 is in contact with air A1 inside the interior space I. The housing further includes an opening 240 provided on a side of the exposed part 220 for allowing the inner space 202 of the housing 200 to communicate with the interior space I of the vehicle through the opening 240 and a non-contact sensor 300 provided on the inner space 202 of the housing 200. Accordingly, the housing 200 of the apparatus is configured for measuring temperatures of the exposed part 220 and the opening 240 by using a non-contact method. In addition, a controller C is provided for calculating temperature of the interior space I of the vehicle by using a measured value of the non-contact sensor 300.

As shown in FIG. 1, the interior panel 100 of the vehicle may have an air conditioner control, and the apparatus for measuring the interior temperature of the vehicle may be installed into the air conditioner control according to the present disclosure. Thus, the apparatus for measuring the interior temperature of the vehicle may share a control board of the air conditioner control, and transmit temperature information quickly. In addition to the air conditioner control, the apparatus for measuring the interior temperature of the vehicle according to the present disclosure may be installed in various parts of the interior panel 100 of the vehicle such as around a center fascia.

In the vehicle, many disturbances affect the apparatus for measuring the interior temperature of the vehicle. Mainly, one of the disturbances is direct sunlight S radiated into the interior space I of the vehicle. When direct sunlight S directly affects the apparatus for measuring the interior temperature of the vehicle, the apparatus may measure a temperature higher than actual interior temperature thereby including an error.

In addition, an engine room of the vehicle is usually separated from the interior space I of the vehicle by a dash panel 620. However, due to a high power or high temperature environment in the engine room, heat of an engine 600 affects the interior temperature of the vehicle through conduction of the dash panel 620, and affects temperature of the interior panel 100 of the vehicle. In this case, the apparatus for measuring the interior temperature of the vehicle has also the error measuring the interior temperature higher than the actual interior temperature.

In addition, even when the apparatus for measuring the interior temperature of the vehicle is installed with an air conditioner control panel, heating of the electronic devices affects temperature measurement.

Therefore, it is desired to cover a sensor with an infrared ray blocking material. In addition, the base substrate 400 for sensing a signal of the sensor of the present disclosure is provided inside the interior panel 100 of the vehicle for reducing effects of the external disturbances as described above.

As shown in FIG. 2, the housing 200 of the sensor is installed on the base substrate 400, and provides the separate inner space 202 in the housing 200 itself. The housing 200 is molded with a material including the infrared ray blocking material for inhibiting temperature of the inner space 202 from rising by the external infrared rays. A radiation sensor 500 provided at a front side of the vehicle determines whether direct sunlight is incident or not (See FIG. 1).

In addition, the housing 200 has the exposed part 220 provided in one side of the housing and exposed to the interior space I of the vehicle for being in contact with air A1 inside the interior space I. The housing also has the opening 240 provided on a side of the exposed part 220 for allowing the inner space 202 of the housing 200 to communicate with the interior space I of the vehicle through the opening 240. In other words, the temperature of the exposed part 220 exposed to the interior space I of the vehicle directly is measured as a basis of the interior temperature, and corrected with reference to temperature of the opening 240 according to situations. Thus, it is possible to measure the interior temperature accurately.

The non-contact sensor 300 is provided in the inner space 202 of the housing 200 and measures temperatures of the exposed part 220 and the opening 240 by using a non-contact method such as an infrared temperature sensor. The controller C calculates the temperature of the interior space I of the vehicle by using the measured values of the non-contact sensor 300.

As shown in FIG. 2, a rear portion of the housing 200 is fixed on the base substrate 400, and a front end portion of the housing 200 protrudes toward the inner space 202 of the vehicle. Thus, the inner space 202 of the housing 200 communicates with the interior space I of the vehicle thereby having a predetermined difference in temperature, not same temperature in real time. The protruded front end portion of the housing 200 may pass through the interior panel 100 of the vehicle and be exposed to the interior space I of the vehicle, thus the exposed part 220 of the housing 200 is placed inside the interior space I of the vehicle. Accordingly, the exposed part 220 of the housing 200 itself substantially indicates same temperature as the interior space I of the vehicle.

In addition, the housing 200 may be molded with the material including the infrared ray blocking material or coated with an infrared ray blocking film for thermal blocking the inner space 202 the housing 200. The housing may be inserted at a surface of a molding or inside the molding by using indium tin oxide (ITO) film, or be formed in a molding by using a nano powder such as ATO, Sb2O3-ZnO.

As shown in FIG. 2, the housing 200 is partially opened at a side of the exposed part 220 of the housing 200 to form the opening 240, thus allows a portion of air A1 inside the interior space I of the vehicle to circulate with a portion of air A2 inside the inner space 202 of the housing 200 through the opening 240. Furthermore, the housing 200 may include a protrusion 260 provided on an edge of the opening 240 by extending and protruding toward the inner space 202.

The protrusion 260 may be a partition wall for blocking the non-contact sensor 300 from the opening 240. The non-contact sensor 300 may measure temperature of an inner wall surface of the exposed part 220 of the housing 200 at an area above the protrusion 260, and measure temperature of the protrusion 260 as the temperature of the opening 240 of the housing 200. In addition, since the opening 240 is provided at a lower portion of the housing 200, when sunlight is radiated into the interior space I of the vehicle, the opening 240 may be shielded by the exposed part 220, thereby being inhibited or prevented from being directly exposed to direct sunlight.

The exposed part 220 of the housing 200 itself indicates similar temperature to the interior temperature of the vehicle by the structure as described above. However, when direct sunlight is incident to the interior panel 100 of the vehicle, the exposed part 220 receiving direct sunlight may indicate temperature higher than the interior temperature of the vehicle. In addition, since the protrusion 260 of the housing 200 is placed in the inner space 202 of the housing 200, the protrusion 260 is not directly affected by direct sunlight due to the infrared ray blocking material on the housing 200, and preferably indicates similar temperature to the interior space I of the vehicle. Therefore, the housing 200 of the present disclosure can monitor normal interior temperature of the vehicle by using the exposed part 220, and correct the measured value of the interior temperature of the vehicle by using the temperature of the protrusion 260, which is not affected by direct sunlight or an internal heat source according to situations.

The non-contact sensor 300 may be provided in the inner space 202 of the housing 200 by being fixed at a position spaced apart from the base substrate 400. Accordingly, the non-contact sensor 300 is not disturbed by heating of the base substrate 400. In addition, the non-contact sensor 300 is placed between the opening 240 of the housing 200 and the base substrate 400, thus the non-contact sensor 300 may measure all temperatures of the exposed part 220 and the opening 240 without being disturbed by heat of the substrate 400.

Referring to FIG. 3, as a flowchart of a method for measuring the interior temperature of the vehicle by using the apparatus for measuring the interior temperature in FIG. 1, the method for measuring the interior temperature of the vehicle by using the apparatus for measuring the interior temperature of the vehicle includes steps of measuring the temperature of the exposed part 220 by using the non-contact sensor 300, measuring the temperature of the opening 240 of the housing 200 by using the non-contact sensor 300, determining whether direct sunlight S is radiated into the interior space I of the vehicle or not, and calculating the interior temperature of the vehicle by using the controller C with the temperature of the exposed part 220, the temperature of the opening 240, a difference value between the temperature of the exposed part 220 and the temperature of the opening 240, and determination of whether direct sunlight S is radiated into the interior space I of the vehicle or not.

As shown in FIG. 3, when the air conditioner of the vehicle is in operation S10, the temperature of the exposed part 220 is higher than the temperature of the opening 240, and direct sunlight S is radiated into the interior space I of the vehicle S100 and S120, the controller C determines that the temperature of the exposed part 220 is distorted by direct sunlight S. The controller C may correct the temperature of the exposed part 220 by using a difference value between the temperature of the exposed part 220 and the temperature of the opening 240, thereby calculating the interior temperature of the vehicle S122. Accordingly, in S122, the interior temperature of the vehicle is obtained by the following expression, the interior temperature=the temperature of the exposed part−(the temperature of the exposed part−the temperature of the opening)×K. Here, K is a random tuning value set by a test. The temperature of the exposed part 220 is a slightly higher due to exposure to direct sunlight S, thus when the temperature of the exposed part 220 is corrected by using a difference between the temperature of the opening 240 with a little effect of direct sunlight S and the temperature of the exposed part 220, a relatively accurate interior temperature of the vehicle may be calculated.

When the temperature of the exposed part 220 is higher than the temperature of the opening 240, direct sunlight S is not radiated into the interior space I of the vehicle S100 and S120, and the temperature of the exposed part 220 is steeply increased above a predetermined rate S140, the controller may determine that hot object is close to the sensor, and calculate the interior temperature of the vehicle by using the temperature of the opening S142. However, in a general case, not the above case, the controller C determines that the temperature of the exposed part 240 is the interior temperature of the vehicle S144.

When the temperature of the exposed part 220 is lower than the temperature of the opening 240, and the vehicle has been started for more than a predetermined time S200 and S220, the controller C preferably determines that the temperature of the opening 240 is distorted by engine heat, etc. Therefore, in this case, it is desired to correct a distortion of the temperature of the exposed part 220, so that the controller C may calculate the interior temperature of the vehicle by correcting the temperature of the exposed part 220 by using the temperature of the opening S222. Accordingly, in S222, the interior temperature of the vehicle is obtained by the following expression, the interior temperature=the temperature of the exposed part−the temperature of the opening×M. M is also a constant such as K, set in advance by the test.

In addition, when the temperature of the exposed part 220 is lower than the temperature of the opening S200, and the temperature of the exposed part drops precipitously above a predetermined rate S240, the controller may determine that the temperature of the exposed part is distorted due to proximity with an external cold object, thereby calculating the interior temperature of the vehicle by using the temperature of the opening S242. Likewise, in a general case, not the above case, the controller may determine that the temperature of the exposed part is the interior temperature of the vehicle S244 and S246.

According to the present disclosure, the apparatus and the method may measure the interior temperature of the vehicle by using a non-suction method and the non-contact method, and measure the interior temperature of the vehicle accurately by considering disturbances such as an external direct sunlight or an internal heat source.

Since the present disclosure allows a structure wherein air suction is not desired and effects of an internal circuit board or the engine heat can be reduced, the present disclosure provides an advantage of being able to easily and reliably measure temperature of the interior space of the vehicle.

While this present disclosure has been described in connection with what is presently considered to be practical exemplary forms, it is to be understood that the present disclosure is not limited to the disclosed forms, but, on the contrary, it is intended to cover various modifications and equivalent arrangements included within the spirit and scope of the present disclosure.

What is claimed is:

1. An apparatus for measuring interior temperature of an interior space of a vehicle, the apparatus comprising:
   a base substrate provided inside an interior panel of the vehicle;
   a housing installed on the base substrate, the housing providing an inner space and including an infrared ray blocking material configured to inhibit an inner temperature inside the inner space from rising due to exposure to external infrared rays, an exposed part provided on one side of the housing and exposed to the interior space of the vehicle, the exposed part being in contact with air inside the interior space, and an opening provided on a side of the exposed part, the opening structured to communicate the inner space of the housing with the interior space of the vehicle through the opening;
   a non-contact sensor provided in the inner space of the housing, the non-contact sensor measuring a temperature of the exposed part and a temperature of the opening by using a non-contact method; and
   a controller calculating the interior temperature of the interior space of the vehicle by using measured values of the non-contact sensor,
   wherein the housing includes a protrusion provided on an edge of the opening of the housing, and the protrusion extends toward the inner space of the housing, and
   wherein the non-contact sensor measures a temperature of an inner wall surface of the exposed part of the housing at an area which is positioned higher than the protrusion as the temperature of the exposed part, and measures temperature of the protrusion as the temperature of the opening of the housing.

2. The apparatus of claim 1, wherein a rear end portion of the housing is fixed on the base substrate and a front end portion of the housing protrudes toward the interior space of the vehicle, and the protruded front end portion passes through an interior panel of the vehicle and is exposed to the interior space of the vehicle as the exposed part of the housing.

3. The apparatus of claim 1, wherein the housing is molded with a material including the infrared ray blocking material or coated with an infrared ray blocking film.

4. The apparatus of claim 1, wherein the protrusion is a partition wall provided between the non-contact sensor and the opening.

5. The apparatus of claim 1, wherein the non-contact sensor is provided in the inner space of the housing by being fixed at a position spaced apart from the base substrate.

6. The apparatus of claim 1, wherein the non-contact sensor is placed between the opening of the housing and the base substrate.

7. The apparatus of claim 1, wherein the opening is provided on a downward surface of the housing and shielded by the exposed part when sunlight is radiated into the interior space of the vehicle, thereby being inhibited from being directly exposed to the direct sunlight.

8. The apparatus of claim 1, wherein, when the temperature of the exposed part is higher than the temperature of the opening, and a radiation sensor determines that direct sunlight is radiated into the interior space of the vehicle, the controller corrects the temperature of the exposed part by using a difference value between the temperature of the exposed part and the temperature of the opening, thereby calculating the interior temperature of the vehicle.

9. The apparatus of claim 1, wherein, when the temperature of the exposed part is higher than the temperature of the opening, and a radiation sensor determines that direct sunlight is not radiated into the interior space of the vehicle, and when the temperature of the exposed part is increased, the controller calculates the interior temperature of the vehicle by using the temperature of the opening.

10. The apparatus of claim 1, wherein, when the temperature of the exposed part is lower than temperature of the opening, and after the vehicle is started, the controller corrects the temperature of the exposed part by using the temperature of the opening, thereby calculating the interior temperature of the vehicle.

11. The apparatus of claim 1, wherein, when the temperature of the exposed part is lower than the temperature of the opening, and the temperature of the exposed part drops, the controller calculates the interior temperature of the vehicle by using the temperature of the opening.

12. The apparatus of claim 1, wherein the interior panel of the vehicle includes an air conditioner control panel of the vehicle.

13. A method for measuring interior temperature of an interior space of a vehicle, the method comprising the steps of:

providing an apparatus comprising,
 a housing installed in the interior space, the housing providing an inner space and including an infrared ray blocking material configured to inhibit an inner temperature inside the inner space from rising due to exposure to external infrared rays, an exposed part of the housing being exposed to the interior space of the vehicle, the exposed part being in contact with air inside the interior space, and an opening provided in the exposed part, the opening structured to communicate the inner space of the housing with the interior space of the vehicle, and
 a non-contact sensor provided on the inner space of the housing;
measuring a temperature of the exposed part of the housing by using the non-contact sensor;
measuring a temperature of the opening of the housing by using the non-contact sensor;
determining whether direct sunlight is radiated into the interior space of the vehicle; and
calculating the interior temperature of the vehicle by using the controller based on the measured temperature of the exposed part, the measured temperature of the opening, a difference value between the measured temperature of the exposed part and the measured temperature of the opening, and the determination of whether the direct sunlight is radiated into the interior space of the vehicle.

* * * * *